United States Patent
Wotton et al.

(10) Patent No.: US 6,866,378 B2
(45) Date of Patent: Mar. 15, 2005

(54) CONDUCTIVE ADDITIVES FOR USE IN PRINTING PROCESSES EMPLOYING RADIATIONAL DRYING

(75) Inventors: Geoff Wotton, Battle Ground, WA (US); Mark L. Choy, San Diego, CA (US); Yi-Hua Tsao, San Diego, CA (US); Steven B Elgee, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/282,364

(22) Filed: Oct. 28, 2002

(65) Prior Publication Data

US 2004/0080593 A1 Apr. 29, 2004

(51) Int. Cl.[7] ............................. B41J 2/01; C03C 17/00
(52) U.S. Cl. ....................... 347/100; 347/101; 347/102; 523/160
(58) Field of Search ................................. 347/100, 101, 347/102, 96, 95, 105, 103, 98; 106/31.13, 31.6, 31.27; 523/160; 428/32.1, 195

(56) References Cited

U.S. PATENT DOCUMENTS

| | | | |
|---|---|---|---|
| 1,303,303 A | 5/1919 | Hamilton | |
| 4,490,728 A | 12/1984 | Vaught et al. | |
| 4,978,969 A | 12/1990 | Chieng | |
| 5,038,009 A | 8/1991 | Babbitt | |
| 5,220,346 A | * 6/1993 | Carreira et al. | 347/102 |
| 5,308,945 A | 5/1994 | VanHandel et al. | |
| 5,563,644 A | 10/1996 | Isganitis et al. | |
| 5,631,685 A | 5/1997 | Gooray et al. | |
| 5,709,737 A | 1/1998 | Malhotra et al. | |
| 5,764,263 A | * 6/1998 | Lin | 347/101 |
| 5,814,138 A | * 9/1998 | Fague | 106/31.46 |
| 5,837,766 A | 11/1998 | Metro et al. | |
| 5,853,469 A | 12/1998 | Colt et al. | |
| 5,936,008 A | * 8/1999 | Jones et al. | 347/102 |
| 5,969,003 A | 10/1999 | Foucher et al. | |
| 5,997,623 A | 12/1999 | Lin | |
| 6,025,101 A | * 2/2000 | Ohtsu et al. | 430/52 |
| 6,126,281 A | * 10/2000 | Shimoda et al. | 347/101 |
| 6,198,901 B1 | 3/2001 | Watanabe | |
| 6,283,589 B1 | * 9/2001 | Gelbart | 347/101 |
| 6,306,204 B1 | 10/2001 | Lin | |
| 6,383,274 B1 | * 5/2002 | Lin | 106/31.27 |
| 6,416,175 B2 | * 7/2002 | Furukawa et al. | 347/103 |
| 2003/0172840 A1 | * 9/2003 | Blank et al. | 106/31.27 |

FOREIGN PATENT DOCUMENTS

| | | |
|---|---|---|
| EP | 0559324 A1 | 2/1993 |
| JP | 08020738 A | 1/1996 |

* cited by examiner

*Primary Examiner*—Manish Shah

(57) ABSTRACT

Conductive additives, the aqueous inks and precoat agent compositions to which the additives are added, and the methods for using such conductive additives in the aqueous inks and precoat agent compositions in printing processes employing microwave or radiofrequency (RF) drying processes.

29 Claims, 2 Drawing Sheets

CONDUCTIVE ADDITIVES FOR USE IN PRINTING PROCESSES EMPLOYING RADIATIONAL DRYING

FIELD OF THE INVENTION

The present invention relates generally to aqueous ink and precoat agent compositions, and more specifically to conductive additives for use in printing processes employing microwave or radiofrequency (RF) drying processes.

BACKGROUND OF THE INVENTION

A variety of printing systems exist today that employ liquid inks requiring drying after they are applied to a print media or substrate.

Aqueous inks used in ink jet printing as well as other printing processes have water as a major component. Although water has the advantage of being non-toxic, environmentally friendly, and an excellent solvent for dyes, it has the disadvantage of interacting with cellulose fibers in wood-based papers to cause two major distortions known as paper cockle and paper curl. Paper cockle is a distortion in which bumps, indentations, and other irregularities produced on the printed paper give the paper a wrinkled appearance. Curl is a phenomenon in which the edges of the paper migrate towards the center of the paper. It is desirable to remove the moisture quickly from the deposited ink and substrate so as to fix the ink to the substrate with a minimal amount of cockle and curl.

Printing processes have been developed that attempt to speed the drying of ink following application to the print media. One approach to drying is to use highly volatile solvents in the ink jet inks (alcohols, ethers, etc.). However, there are issues of toxicity and flashpoint related to the use of these components. In addition, many ink formulations using this approach generally give poorer text quality on plain paper media due to poor edge acuity.

Another approach to drying involves the addition of heat to effect removal of the moisture content of the ink. Existing printing processes employing conductive heaters are not very efficient because extra power must be supplied to compensate for thermal losses to the environment and print media. Also, if the conductive heater is located in the printing zone, it typically impacts reliability in a negative fashion. In printing processes employing convective heating, hot air is blown on the print media to dry the ink. However, convective heating is even less efficient than conductive heating and if the velocity of the hot air is too high, it can misdirect ink droplets and cause image quality defects. Infrared radiation is another option in delivering thermal energy to the print media, but presents a fire hazard if for any reason the print media (e.g., paper) being printed upon stops moving through the printer.

In addition to the foregoing problems, thermal heat impacts the print media. Problematic thermal effects include paper dimensional changes such as anisotropic shrinking, dry cockle and curl. Pre-heating is also typically required to prevent the paper from shrinking in the print zone while being heated. Therefore, research has focused on inks that dry more quickly while minimizing dimensional changes in the print media.

Another approach to drying inks in printing processes is to use microwave energy to heat the inks. Because current inks do not absorb microwave energy well, microwave applicators are required to be very large to allow for increased dwell time in the microwave cavity. In traditional printing processes employing heating, the maximum temperature that the print media can withstand (~80° C. for special paper media) dictates the maximum heater temperature.

A few inks specifically intended for ink jet printing processes employing microwave radiation are known.

Thus, a need remains for improved ink compositions and printing processes employing microwave drying that result in quick removal of the moisture content from the print media to which an ink has been applied. Improvements in drying time and reductions in print media dimensional changes and microwave applicator size and power requirements would be welcome benefits.

SUMMARY OF THE INVENTION

It is accordingly an object of the present invention to address the needs described above for compositions and/or printing processes that allow rapid removal of moisture from inks applied to print media substrates.

The needs identified above and others are addressed, in one aspect, by the present invention, which provides a thermal ink for use in printing processes employing radiational (i.e., microwave or radiofrequency) drying. In one embodiment, the thermal ink comprises an aqueous liquid vehicle, a colorant, and a radiation absorbing additive. In another aspect, the present invention provides a printing process for printing an image on a print media substrate comprising the steps of applying as a printed image to an image-receiving print media substrate the thermal ink and thereafter exposing the image-receiving substrate to microwave or RF radiation to dry the image on the substrate.

In another aspect, the present invention provides a radiation absorbing precoat agent for precoating an image-receiving substrate in a printing process in order to render the substrate more susceptible to microwave or RF drying. The radiation absorbing precoat agent comprises an aqueous liquid vehicle and a radiation absorbing additive.

In yet another aspect, the present invention provides a printing process employing microwave or RF drying comprised of the steps of coating an image-receiving substrate with the radiation absorbing precoat agent further comprised of an aqueous liquid vehicle and a radiation absorbing additive, applying a thermal ink as a printed image to the image-receiving substrate, and thereafter exposing the image receiving substrate to microwave or RF radiation to dry the image on the substrate.

DETAILED DESCRIPTION OF CERTAIN PREFERRED EMBODIMENTS

Figure 1:
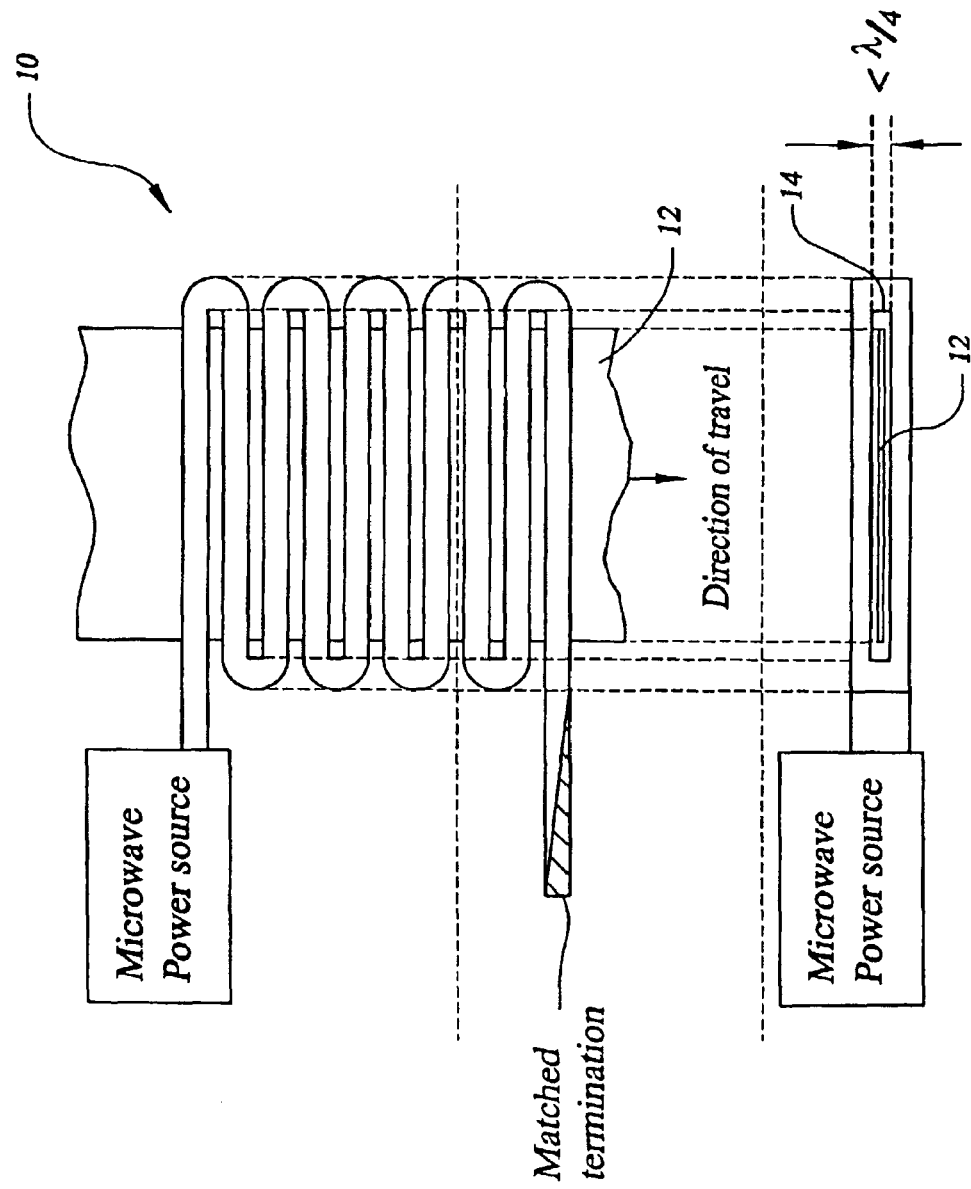
FIG. 1 is a illustration of an example microwave applicator such as might be employed in accordance with an embodiment of the present invention.

Preferred embodiments of the invention will now be described with reference to the accompanying figures of the drawing.

The present invention is directed to conductive materials for use in printing processes with radiational drying (i.e., microwave and radiofrequency radiation). The conductive materials are incorporated into an additive that is an ingredient of the ink used in the printing process, or alternatively in a precoat agent that is applied, preferably, to the print media substrate prior to the application of an ink not having the conductive additive as an ingredient. Consequently, in either embodiment, increased power dissipation and selective heating of the ink in printed areas is achievable by converting microwave or RF energy generated by an applicator into thermal energy through coupling to the conductive materials. This results in a more rapid removal of moisture from the ink and substrate and in a reduction of print media dimensional changes (e.g., cockle and curl) due to prolonged temperature changes. An additional advantage of the present invention is that highly volatile components are not required.

A microwave or RF dryable thermal ink in accordance with the present invention is comprised of an aqueous vehicle, a colorant and an additive in which are suspended or dissolved conductive materials having a conductivity of from about 10 to 250 mS/cm, and preferably from about 100 to 200 mS/cm. The conductive materials comprise approximately from about 0.1 to about 20%, and preferably from about 1 to 10% by weight of the ink.

In certain embodiments, the conductive materials may comprise metallic particles and/or carbon black. The metallic particles and carbon black are preferably as small as possible so as not to preclude their use in ink jet printer inks. The metallic particles and carbon black preferably have average diameters that are no greater than a few microns. In testing described below, the carbon black formulation used by the applicants had average particle sizes of a few microns in an amount of about 4% by weight. The amount of metallic particles present in the ink can vary, depending upon the desired ink conductivity, the desired printing process speed, the ink deposition density, and the power level of the microwave or RF drying apparatus. The maximum conductivity achievable will be limited by the need to avoid arcing in the microwave field.

In other embodiments, the conductive materials may comprise conductive polymers that are suspended or dissolved in the liquid vehicle. Examples of such conductive polymers include those containing conjugated double bonds in the polymer backbone, such as polyacetylene, polyaniline, polypyrrole, polyparaphenylene, polythiophene, poly(paraphenylene vinylene) and the like available from Aldrich, those non-conjugated materials such as poly(N-vinylcarbazole), poly(4-(N,N-diphenylamine) phenylmethyl methacrylate), poly(3-vinylperylene) and the like available from Aldrich, those non-conjugated polymers with iodine or polyiodides such as polybutadiene, poly (ethylene oxide), and poly(4-vinylpyridine) available from Aldrich, as well as mixtures thereof. Additionally, water soluble conducting polymers such as sulfonated polyaniline, sulfonated polypyrrole and poly(diallyldimethylammonium chloride) available from Aldrich, and poly (dimethylaminoethylmethacrylate chloride) available from Polysciences, as well as mixtures thereof, may be employed. Preferably, the conductive polymer is selected so that a relatively small amount is required in the ink composition to obtain the desired conductivity. For example, it is preferred that the conductive polymer exhibit a high degree of dissociation in the aqueous liquid vehicle of the ink, since a higher degree of dissociation results in more free ions present in the liquid and thus results in higher conductivity for a given weight amount of conductive polymer. The conductive polymer preferably is selected to optimize solubility of the other ink composition ingredients. The conductive polymer preferably is present in an amount from about 0.1 to 20%, and preferably from about 1 to 10% by weight of the ink.

The liquid vehicle of an ink composition consistent with the present invention may be comprised of water, or it may comprise a mixture of water and a miscible organic component, such as ethylene glycol, propylene glycol, diethylene glycols, glycerine, amides, ethers, carboxylic acids, esters, alcohols, organosulfides, organosulfoxides, sulfones, alcohol derivatives, ether derivatives, amino alcohols, ketones and other water miscible materials, as well as mixtures thereof. When mixtures of water and water miscible organic liquids are selected as the liquid vehicle, the water to organic ratio may be in any effective range. In ink compositions consistent with the present invention, the liquid vehicle is generally present in an amount of from about 50 to about 99.5% by weight, and preferably from about 60 to about 90% by weight, although the amount can be outside these ranges.

The colorant for the ink composition of the present invention can be a dye, a pigment, or a mixture of one or more dyes and/or one or more pigments. A wide variety of dyes are commercially available (e.g., See list appearing in U.S. Pat. No. 5,220,346 to Carreira, et al.), any of which may be used in the present invention. Some examples of suitable dyes include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Direct Blue 199; Direct Blue 86; Reactive Red 4; Acid Red 92; Cartasol Yellow GTF Presscake, available from Sandoz, Inc.; Acid Yellow 23; Basacid Black X34, available from BASF, Carta Black 2GT, available from Sandoz, Inc.; Direct Brilliant Pink B (Crompton-Knolls); Levaderm Lemon Yellow (Mobay Chemical Company); Spirit Fast Yellow 3G; -Sirius Supra Yellow GD 167; Pyrazol Black BG (ICI); Morfast Black Conc A (Morton-Thiokol); Diazol Black RN Quad (ICI); Direct Yellow 86; Acid Red 249); Direct Black 168; Direct Yellow 132; Aminyl Brilliant Red F-B, available from Sumitomo Chemical Co. (Japan), and the like, as well as mixtures thereof. The dyes may appear in any effective amount, typically from about 1 to 20% by weight, and preferably from about 1.5 to about 6% by weight, although the amount can be outside these ranges.

A wide variety of pigments are also commercially available for use in the invention (See the '346 patent cited above). The pigment can be black, cyan, magenta, yellow, red, blue, green, brown, mixtures thereof, and the like. Examples of suitable black pigments include various carbon blacks such as channel black, furnace black, lamp black, and the like. Examples of suitable pigments include: cyan pigments copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like; yellow pigments diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo4'-chloro-2,5dimethoxy aceto-acetanilide, Permanent Yellow FGL, and the like; Normandy Magenta RD2400 (Paul Uhlich); Paliogen Violet 5100 (BASF); Heliogen Green L8730 (BASF); Heliogen Blue L6900, L7020 (BASF); Sudan Orange G (Aldrich); Paliogen Yellow 152, 1560 (BASF); and many others not listed here. The pigments' particle size is preferably as small as possible to enable stable colloidal suspension of the particles in the ink composition and to prevent clogging of the ink channels when the ink composition is employed in thermal ink jet printing. Preferred particle average diameters are generally from about 0.001 to about 3 microns, and more preferably from about 0.1 to about 1 microns, although the particle diameters may be outside these ranges. The pigment are present in the ink compositions in any effective amount, generally from about 1 to about 20% by weight and preferably from about 4 to about 8% by weight.

Other additives can also be present in the ink compositions of the present invention. For example, surfactants or wetting agents can be added to the ink. These additives may be of the commercially available cationic, anionic, or nonionic types. Suitable surfactants and wetting agents include Tamol™ SN, Tamol™ LG, those of the Triton™ series available from Rohm and Haas Co., those of the Marasperse™ series, those of the Igepal™ series available from GAF Co., those of the Tergitol™ series, those of the Dupono™ series available from E.I. Du Pont de Nemours & Co., Emulphor ON 870 and ON 877, available from GAF, and other commercially available surfactants. These surfactants and wetting agents are present in effective amounts, generally from 0 to about 15% by weight, and preferably from about 0.01 to about 8% by weight, although the amount can be outside these ranges.

Polymeric additives can also be added to the inks to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the Discole series available from DKS International, Tokyo, Japan, the Jeffamine™ series available from Texaco, Bellaire, Tex., and the like. The polymeric additives appear in amounts of from 0.1 to about 20% by weight, and preferably from about 1 to about 10% by weight, although the amount can be outside these ranges.

Other optional additives to the inks in accordance with the present invention include biocides such as Dowicil 150 or 200, benzoate salts, sorbate salts, and the like, present in an amount of from about 0.0001 to about 10 percent by weight, preferably from about 0.001 to about 8 percent by weight, and more preferably from about 0.01 to about 4.0 percent by weight, although the amount can be outside these ranges; pH controlling agents such as acids or bases, phosphate salts, carboxylate salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges.

The inks of the present invention can be prepared by any process suitable for preparing aqueous-based inks. The amounts can be outside of these ranges provided that the conductivity objectives of the present invention are achieved. The inks are applied as printed images to a print media substrate. Any suitable printing process compatible with aqueous based inks may be employed, including ink jet printing (including continuous stream and drop-on-demand), flexographic printing, pen plotters, and roller types of printing. And any suitable print media substrate compatible with aqueous based inks may be printed upon.

Any suitable microwave or RF apparatus may then be employed to dry the ink applied to the print media substrate. FIG. 1 illustrates one such apparatus, a microwave meander applicator 10. In the applicator 10, print media substrate 12 emerges from exit slot 14 after being exposed to microwave radiation that is absorbed much more efficiently by the ink than by the print media substrate material. The average microwave or RF power employed in a suitable drying apparatus may be on the order of 100 to 1500 Watts, depending upon the conductivity of the conductive materials and their susceptibility to the radiation selected. RF energy may be employed, but it is typically less efficient for drying purposes. The description to this point has focused on the incorporation of conductive materials into microwave or RF dryable thermal ink compositions, however alternative embodiments of the present invention exist. For example, the conductive materials described above may alternatively be combined with an aqueous liquid vehicle to form a precoating agent for application to a print media substrate in a separate step prior to application of a conventional thermal ink. The precoat agent is preferably applied to form a precoat image matching the image formed from the conventional thermal ink. A precoating roller may be employed for this purpose. One or more areas of increased conductivity facilitating radiational drying may thus be formed by the reaction of the precoat agent with the ink, or by the reaction of the precoat agent with the print media substrate.

A precoat agent in accordance with the present invention has a nearly identical composition to the inventive inks described above, but does not require colorants. Precoating may be employed in any type of printing process suitable for use with aqueous based inks.

Specific embodiments of ink compositions that were tested will now be described. These examples are intended to be illustrative, and the invention is not limited to the specific ingredients and corresponding amounts set forth herein. All parts and percentages are by weight unless otherwise indicated.

Two ink compositions have been tested by the Applicants.

The first ink composition tested was HP4™ black inkjet print cartridge 51645A ink, which contains approximately 4% carbon black by weight.

The second ink composition tested was PELCO™ Colloidal Graphite water base carbon paint (Cat. No. 16051) available from Ted Pella, Inc., comprised of approximately 50% graphite by weight and having an average flake size of 1 micron.

Figure 2:
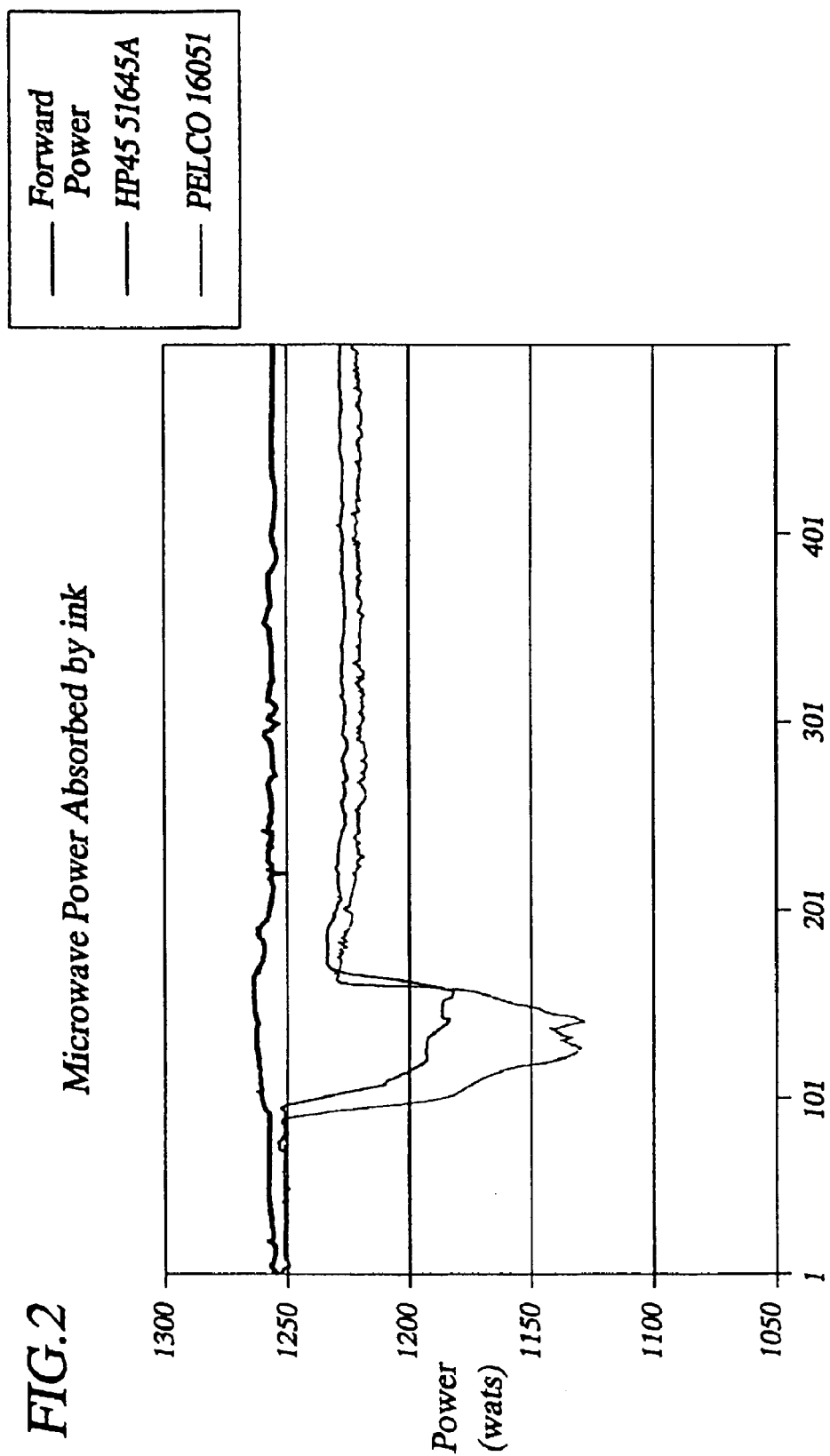
FIG. 2 is a graph illustrating microwave absorption test results of two inks in accordance with an embodiment of the present invention.

These ink compositions were tested for absorptivity on a microwave testbed. The results of this testing are attached as FIG. 2. The results of this testing demonstrate that ink compositions in accordance with the present invention are suitable for printing processes employing radiational drying and further show that some of the ink additives disclosed herein respond to such energies and are thus useful in raising the temperature of the inks, thereby enabling faster drying of images and reduced print media cockle and curl.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A microwave or radiofrequency dryable thermal ink comprising:

an aqueous liquid vehicle;

a colorant; and a conductive additive having a conductivity of about 10 to 250 mS/cm and adapted and constructed to react with an image-receiving substrate to form an area of increased conductivity proportional to the amount of conductive additive.

2. The thermal ink of claim 1, wherein the conductive additive further comprises metal particles.

3. The thermal ink of claim 1, wherein the conductive additive further comprises carbon black particles.

4. The thermal ink of claim 1, wherein the conductive additive further comprises water soluble conductive polymers in an amount of from about 0.1 to about 20% by weight of the ink.

5. The thermal ink of claim 1, wherein the conductive additive further comprises conductive polymers selected from the group of materials consisting of polyacetylene, polyaniline, polypyrrole, polyparaphenylene, polythiophene, poly(paraphenylene vinylene), poly(N-vinylcarbazole), poly(4-(N,N-diphenylamine)phenylmethyl methacrylate), poly(3-vinylperylene), polybutadiene, poly(ethylene oxide), poly(4-vinylpyridine), sulfonated polyaniline, sulfonated polypyrrole, poly(diallyldimethylammonium chloride), and poly(dimethylaminoethylmethacrylate chloride).

6. A method of printing an image on an image receiving substrate with a microwave or radiofrequency dryable thermal ink, comprising the steps of:
applying in imagewise fashion to the substrate a microwave dryable thermal ink comprising an aqueous liquid vehicle, a colorant, and a conductive additive; and
exposing the image receiving substrate to microwave radiation to dry the image on the substrate, wherein the conductive additive and image receiving substrate react to form an area of increased conductivity proportional to the amount of the conductive additive applied.

7. The method of claim 6, wherein the conductive additive further comprises metal particles.

8. The method of claim 6, wherein the conductive additive further comprises carbon black particles.

9. The method of claim 6, wherein the conductive additive further comprises a water soluble conductive polymer in an amount from about 1 to about 10% by weight of the ink.

10. The method of claim 6, wherein the conductive additive further comprises conductive polymers selected from the group of materials consisting of polyacetylene, polyaniline, polypyrrole, polyparaphenylene, polythiophene, poly(paraphenylene vinylene), poly(N-vinylcarbazole), poly(4-(N,N-diphenylamine)phenylmethyl methacrylate), poly(3-vinylperylene), polybutadiene, poly(ethylene oxide), poly(4-vinylpyridine), sulfonated polyaniline, sulfonated polypyrrole, poly(diallyldimethylammonium chloride), and poly(dimethylaminoethylmethacrylate chloride).

11. The method of claim 6, wherein the applying step further comprises:
causing droplets of the ink to be ejected from a thermal ink jet printing apparatus in an imagewise pattern onto the substrate.

12. The method of claim 6, wherein the applying step further comprises:
causing droplets of the ink to be rolled from a roller printing apparatus in an imagewise pattern onto the substrate.

13. The method of claim 6, wherein the microwave radiation exposing the substrate is on the order of 100 to 1500 Watts.

14. A microwave or RF dryable precoat agent for precoating an image-receiving substrate in a printing process in order to render the substrate more susceptible to microwave drying, comprising:

an aqueous liquid vehicle; and
a conductive additive adapted and constructed to react with the image-receiving substrate, a thermal ink disposed on the image-receiving substrate, or both to form an area of increased conductivity proportional to the amount of conductive additive.

15. The precoat agent of claim 14, wherein the conductive additive further comprises metal flakes.

16. The precoat agent of claim 14, wherein the conductive additive further comprises carbon black particles.

17. The precoat agent of claim 14, wherein the conductive additive further comprises conductive polymers in an amount from 0.1 to 20% by weight of the precoat agent.

18. The precoat agent of claim 14, wherein the conductive additive further comprises conductive polymers selected from the group of materials consisting of polyacetylene, polyaniline, polypyrrole, polyparaphenylene, polythiophene, poly(paraphenylene vinylene), poly(N-vinylcarbazole), poly(4-(N,N-diphenylamine)phenylmethyl methacrylate), poly(3-vinylperylene), polybutadiene, poly(ethylene oxide), poly(4-vinylpyridine), sulfonated polyaniline, sulfonated polypyrrole, poly(diallyldimethylammonium chloride), and poly(dimethylaminoethylmethacrylate chloride).

19. A method of printing using microwave or RF drying, comprising the steps of:
precoating a first surface of an image receiving substrate with a microwave dryable precoat agent comprised of an aqueous liquid vehicle and a conductive additive having a conductivity of about 10 to 250 mS/cm and adapted and constructed to react with the image receiving substrate to form an area of increased conductivity proportional to the amount of conductive additive;
applying a thermal ink in imagewise fashion to the first surface of the image receiving substrate; and
exposing the image receiving substrate to microwave or RF radiation to dry the image on the substrate,
wherein the steps of precoating, applying, and exposing result in the printing of an image on the first surface of the image receiving substrate.

20. The method of claim 19, wherein the microwave dryable precoat agent is precoated onto the substrate in an imagewise fashion.

21. The method of claim 19, wherein the conductive additive further comprises metal particles.

22. The method of claim 19, wherein the conductive additive further comprises carbon black particles.

23. The method of claim 19, wherein the conductive additive further comprises conductive polymer particles in an amount from about 1 to about 10% by weight of the precoat agent.

24. The method of claim 19, wherein the conductive additive further comprises conductive polymers selected from the group of materials consisting of polyacetylene, polyaniline, polypyrrole, polyparaphenylene, polythiophene, poly(paraphenylene vinylene), poly(N-vinylcarbazole), poly(4-(N,N-diphenylamine)phenylmethyl methacrylate), poly(3-vinylperylene), polybutadiene, poly(ethylene oxide), poly(4-vinylpyridine), sulfonated polyaniline, sulfonated polypyrrole, poly(diallyldimethylammonium chloride), and poly(dimethylaminoethylmethacrylate chloride).

25. The method of claim 19, wherein the applying step further comprises:
causing droplets of the ink to be ejected from a thermal ink jet printing apparatus in an imagewise pattern onto the substrate.

26. The method of claim 19, wherein the applying step further comprises:

causing droplets of the ink to be rolled from a roller printing apparatus in an imagewise pattern onto the substrate.

27. The method of claim 19, wherein the microwave radiation exposing the substrate is on the order of 100 to 1500 Watts.

28. A method of printing using microwave or RF drying, comprising the steps of:

precoating an image-receiving substrate with a microwave dryable precoat agent comprised of an aqueous liquid vehicle and a conductive additive;

applying a thermal ink in imagewise fashion to the image-receiving substrate; and exposing the image receiving substrate to microwave or RF radiation to dry the image on the substrate, wherein the precoat agent and image-receiving substrate react to form an area of increased conductivity proportional to the amount of the conductive additive applied.

29. A method of printing using microwave or RF drying, comprising the steps of:

precoating an image-receiving substrate with a microwave dryable precoat agent comprised of an aqueous liquid vehicle and a conductive additive;

applying a thermal ink in imagewise fashion to the image-receiving substrate; and exposing the image receiving substrate to microwave or RF radiation to dry the image on the substrate, wherein the precoat agent and thermal ink react to form an area of increased conductivity proportional to the amount of the conductive additive applied.

* * * * *